United States Patent [19]

Brule

[11] 4,068,013

[45] Jan. 10, 1978

[54] FROZEN SWEET SOUFFLÉS AND METHOD OF PREPARING SAME

[76] Inventor: Rene Brule, 125, rue Louise Michele, Sartrouville, Yvelines 78500, France

[21] Appl. No.: 737,179

[22] Filed: Oct. 29, 1976

[30] Foreign Application Priority Data

Apr. 5, 1976 Canada .................................. 249567

[51] Int. Cl.² .............................................. A23G 9/00
[52] U.S. Cl. ..................................... 426/565; 426/568
[58] Field of Search ............... 426/564, 568, 565, 613, 426/558

[56] References Cited

U.S. PATENT DOCUMENTS

| | | | |
|---|---|---|---|
| 2,939,792 | 6/1960 | Kline et al. | 426/564 |
| 3,043,700 | 7/1962 | Szczesniak | 426/568 |
| 3,333,965 | 8/1967 | Kurtzhalts | 426/564 |
| 3,655,405 | 4/1972 | Karas et al. | 426/568 |

*Primary Examiner*—Jeanette M. Hunter

[57] ABSTRACT

A frozen sweet soufflé, comprising an homogeneous mixture of a cooked pastry cream, an uncooked chou paste and stiffy beaten egg whites in a volume ratio of about 1.5:1:1.5, based upon the volume of basic liquid of each ingredient. It has been found that the admixture of an uncooked chou paste to a cooked pastry cream, to which is then incorporated stiffy beaten egg whites, results in a culinary preparation for sweet soufflés which can successfully undergo freezing. The sweet soufflé of the invention can be kept in the frozen state during prolonged storage, without any deterioration or alteration of flavor.

34 Claims, No Drawings

FROZEN SWEET SOUFFLÉS AND METHOD OF PREPARING SAME

The present invention is concerned with a frozen sweet soufflé and a method of preparing the same. More particularly, the invention is directed to a freezable culinary preparation for sweet soufflés.

One of the most difficult problems in the culinary art has been the preparation of high grade soufflés. Everyone knows that it is very difficult to succeed in preparing a sweet soufflé for these pastries are not only real tests of culinary skill but also must be prepared on the premises and, once baked, must be served without delay since even high grade soufflés collapse nearly as rapidly as they cool. Accordingly, the sweet soufflé is a food product which is not adapted to mass production on an industrial scale such to be sold in large chain-stores, hotels and the like; rather, only those restaurants employing an experienced pastry-cook can afford to provide on their menu this exceptionally delicious and wanted dessert.

A conventional method generally utilized for preparing sweet soufflés comprises the following four steps:

a. bring milk to a boil. Mix egg yolks, sugar and flour and add to the boiling milk. Cook over heat, working continuously with the spatula to obtain a cream. This cream is known as "pastry cream";

b. beat egg whites to a stiff peak, and fold into the pastry cream;

c. pour the resulting mixture into a soufflé dish which has been buttered and sprinkled with castor sugar; and d. cook in oven at about 450° F, for approximately 25-30 minutes. Serve immediately.

This method of preparation is not only time consuming and tedious, but does not guarantee any success since intervene many factors which cannot be practically controlled, such as the manner in which the egg whites are beaten, the admixture of these to the pastry cream as well as the constancy of the baking temperature. Even if a most special care is brought during the preparation, it is very difficult to obtain always and without fail a good soufflé of the proper texture, fluffiness and quality.

Many attempts have been made in order to "freeze" a soufflé, and only certain savoury soufflés, namely vegetable soufflés, have been frozen successfully. However, the savoury soufflé is a culinary preparation based on Béchamel sauce and, therefore, is quite different from the type of soufflé with which the present invention is concerned, which is based on pastry cream. Heretofore, a sweet soufflé prepared from the usual recipes has never been able to undergo freezing without any deterioration or alteration of flavour.

It is therefore an object of the present invention to provide a sweet soufflé which can undergo freezing and thus be kept in the frozen state during prolonged storage, without any deterioration of the food product or alteration of its flavour.

It is a further object of the invention to provide a freezable food composition suitable for use in preparing sweet soufflés.

Applicant has found quite unexpectedly that incorporating an uncooked chou paste into the pastry cream before adding the egg whites results in a culinary preparation for sweet soufflés which can successfully undergo freezing.

In accordance with the invention, there is thus provided a freezable culinary preparation for sweet soufflés, which comprises an homogeneous mixture of a cooked pastry cream, an uncooked chou paste and stiffy beaten egg whites in a volume ratio of about 1.5:1:1.5, based upon the volume of basic liquid of each ingredient.

This freezable food composition is obtained, in accordance with a second aspect of the invention, by incorporating an uncooked chou paste into a boiling cooked pastry cream, mixing over heat to obtain an homogeneous mixture and folding in stiffy beaten egg whites to form a smooth composition; the pastry cream, chou paste and beaten egg whites being utilized in a volume ratio of about 1.5:1:1.5, based upon the volume of basic liquid of each ingredient.

The volume of each ingredient or component is based upon the initial amount of basic liquid utilized for preparing the same. The basic liquid for pastry cream is milk, water for chou paste and, of course, egg whites in the case of beaten egg whites. Thus, for example, 1 liter of pastry cream means in the culinary art the quantity of pastry cream obtained starting from 1 liter of milk. Similarly, 1 liter of chou paste is the quantity obtained starting from 1 liter of water.

In order to freeze the culinary preparation of the invention, it suffices to subject it to a temperature comprised between about −15° and about −20° C. A temperature lower than about −20° C may cause denaturation of certain proteins whereas, at a temperature higher than about −15° C, the meringue will tend to separate itself from the composition. Experimentation has shown that a sweet soufflé according to the invention kept in the frozen state over a period of about five months was not affected by such freezing, that is, it did not suffer from any deterioration or alteration of flavour whatsoever. The experiments, however, have not been carried out beyond such lapse of time, but it is reasonably conceivable that the food product can be kept in the frozen state for a period of at least eight months.

In accordance with a preferred embodiment of the invention, use is made of about 1.5 liter of the pastry cream, about 1 liter of the chou paste and about 1.5 liter of the stiffy beaton egg whites, whereby to form a culinary preparation yielding at least about 100 individual servings of equal volume; these individual servings or soufflés are then immediately subjected to freezing. In this connection, it must be pointed out that if such culinary preparation were divided into a lesser number of servings, there would be obtained a frozen soufflé having too big a capacity, which could of course not lend itself to a uniform baking; as a result, during baking of the latter, the peripheral surface would suffer from overcooking, drying or even burning whereas a core would be obtained therein which might still be in the frozen or uncooked state. In such an instance, the pastry cream will then be obtained starting from about: 1.5 liter of whole milk, 0.33 liter of egg yolks, 375 grams of castor sugar and 185 grams of flour; the chou paste starting from about: 1 liter of water, 15 grams of castor sugar, 15 grams of salt, 300 grams of butterfat solids, 600 grams of flour and 1 liter of whole eggs; and, the beaten egg whites starting from about: 1.5 liter of egg whites and 800–900 grams of castor sugar. Each soufflé or individual serving will therefore be seen to comprise a homogeneous mixture of less than about 1.5 centiliter of cooked pastry cream, less than about 1 centiliter of uncooked chou paste and less than about 1.5 centiliter of stiffy beaten egg whites; in other words, less than about: 1.5 centiliter of whole milk, 1 centiliter of water, 0.7 centiliter of egg yolks, 2.1 centiliters of egg whites, 1,250 centigrams of castor sugar, 785 centigrams of flour, 300 centigrams of butterfat solids and 15 centigrams of salt.

If it is desired to flavour the soufflé, a flavouring ingredient such as an alcoholic liqueur, an alcoholic liqueur extract, a concentrated natural juice or a sweetened or unsweetened extract, can be added to the mixture during preparation, but before incorporating the egg whites. Of course, in certain cases, a fruit purée such as a chestnut purée can also be utilized.

The frozen sweet soufflé according to the invention is an uncooked food product and therefore requires baking in oven, before being served. The product of the invention can be cooked in any domestic type oven, as well as in those conventionally employed in the food-processing industry, either of the brick-bottom or rotating type. Baking time ranges from about 22 to 28 minutes at a temperature of about 205° to 232° C (400–450° F). Like any other sweet soufflé, the baked good must be served at once.

The subject invention permits quite unexpectedly the use of aluminum containers as soufflé dishes. Indeed, Applicant has found that the sweet soufflé of the invention can be frozen and thereafter cooked not only in conventional soufflé dishes such as of fire-proof porcelain or oven-glass, but also in dishes made of aluminum. Accordingly, the food product of the invention can lend itself to mass production on an industrial scale and, owing to the use of aluminum containers which is rendered possible by the invention, its cost price and, hence, its purchase price are greatly reduced. Since aluminum does not retain heat, the baked good can safely be manipulated when withdrawn from the oven, without any risk of burns. It must be mentioned that the sweet soufflé of the invention when served in an aluminum container collapses over substantially the same period of time than a conventional soufflé which is served in a dish having heat-retaining characteristics.

The baked products prepared from the frozen food composition according to the invention form excellent souffles with good rising properties, exceptional stability, maintenance of cell structure and other desirable properties, resulting in tender fluffy baked goods. The product of the invention may be successfully employed by any person regardless of its culinary skill, and uniformly good results are assured. In addition, there is a great saving in time.

The invention will now be described in more detail with reference to the following examples which are provided for illustration only and are not intended to limit the invention in any way:

EXAMPLE 1

One liter of chou paste is prepared starting from the following ingredients:
 1 liter of water,
 15 grams of castor sugar,
 15 grams of salt,
 300 grams of butter,
 600 grams of flour,
 18–20 whole eggs (approximately 1 liter).

Boil the water, butter, salt and sugar together in a deep pan with a flat bottom. When the mixture boils, take the pan off the fire and mix in the flour. Dry out the mixture over a low heat, working it with a wooden spoon until the mixture comes away from the sides of the pan and oils a little. Then add, away from the fire, the eggs, two by two, working vigorously all the time. In this preparation, one can utilize instead of butter any other butterfat solids, such as margarine or vegetable shortening.

One liter and a half of pastry cream is thereafter prepared from the following ingredients:
 1.5 liter of whole milk,
 18 egg yolks (approximately 0.33 liter),
 375 grams of castor sugar
 185 grams of flour.

Bring the milk to a boil and add half of the sugar. In a mixing bowl, work the egg yolks and the remaining sugar; pour in the flour and mix well. Stir in half of the boiling sugared milk, working continuously with the spatula. Pour the resulting mixture into the remaining boiling milk and maintain boiling of the cream until cooked, that is for about 5 minutes. Skin forming is prevented by stirring from time to time.

Remove the boiling pastry cream from the fire and immediately add the chou paste. Mix well over heat, until homogenized. It is essential to keep the resulting mixture warm, that is, in a double-boiler at a temperature of up to 60°–70° C, during the period required for preparing the beaten egg whites, approximately 10 to 15 minutes. It is to be pointed out that the chou paste must be incorporated into the pastry cream, for the reverse, i.e. incorporating the pastry cream into the chou paste, will not result in a perfectly homogeneous mixture.

Beat 1.5 liter of egg whites (approximately 48 egg whites) to a stiff peak. Gradually add about 850 grams of castor sugar, working continuously to obtain a stiff meringue.

Remove the mixture "pastry cream and chou paste" from the fire, and fold in at once the stiffy beaten egg whites to form a composition having a perfectly smooth consistency.

Pour the composition into buttered and sugared soufflé dishes each having a capacity of approximately 135 cm³. The dishes are filled substantially to their full content. The culinary preparation thus yields 90 to 100 individual servings which are put at once into a freezer, at a temperature of about 15° to about −20° C.

EXAMPLE 2

The procedure of example 1 is followed, with the exception that about 0.5 liter of kirsch is added to the hot homogeneous mixture of the pastry cream and the chou paste, before incorporating the beaten egg whites. This preparation yields, as the above, approximately 100 soufflés having a delicious kirsch flavour.

EXAMPLE 3

The same procedure as outlined in Example 1 is followed, with the exception that about 0.25 liter of Grand Marnier extract is added to the mixture "pastry cream and chou paste", before incorporating the egg whites. This culinary preparation yields, as in Example 1, approximately 100 soufflés flavoured with Grand Marnier.

EXAMPLE 4

The procedure of Example 1 is followed, with the exception that about 0.25 liter of concentrated strawberry juice is added to the mixture "pastry cream and chou paste", before incorporating the egg whites. This preparation yields, as in Example 1, approximately 100 strawberry soufflés.

EXAMPLE 5

The procedure of Example 1 is followed, with the exception that about 0.1 liter of lemon extract is added to the mixture "pastry cream and chou paste", before incorporating the beaten egg whites. This culinary preparation yields, as in Example 1, approximately 100 lemon soufflés.

I claim:

1. A freezable culinary preparation for sweet soufflés, comprising a homogeneous mixture of a cooked pastry cream, an uncooked chou paste and stiffy beaten egg whites in a volume ratio of about 1.5 : 1 : 1.5, based upon the volume of basic liquid of each ingredient.

2. A freezable culinary preparation as claimed in claim 1, including a flavouring ingredient.

3. A freezable culinary preparation as claimed in claim 1, comprising a homogeneous mixture of about 1.5 liter of cooked pastry cream, about 1 liter of uncooked chou paste and about 1.5 liter of stiffy beaten egg whites, said preparation yielding at least about 100 individual servings of equal volume.

4. A freezable culinary preparation as claimed in claim 3, including about 0.5 liter of an alcoholic liqueur or about 0.25 liter of an alcoholic liqueur extract.

5. A freezable culinary preparation as claimed in claim 3, including about 0.25 liter of a concentrated natural juice or about 0.1 liter of an unsweetened extract.

6. A freezable culinary preparation as claimed in claim 3, wherein said pastry cream is derived from about: 1.5 liter of whole milk, 0.33 liter of egg yolks, 375 grams of castor sugar and 185 grams of flour; said chou paste is derived from about: 1 liter of water, 15 grams of castor sugar, 15 grams of salt, 300 grams of butterfat solids, 600 grams of flour and 1 liter of whole eggs; and said beaten egg whites are derived from about: 1.5 liter of egg whites and 800-900 grams of castor sugar.

7. A freezable culinary preparation as claimed in claim 6, wherein said butterfat solids are selected from the group comprising butter, margarine and vegetable shortening.

8. A frozen sweet soufflé, comprising a homogeneous mixture of a cooked pastry cream, an uncooked chou paste and stiffy beaten egg whites in a volume ratio of about 1.5 : 1 : 1.5 based upon the volume of basic liquid of each ingredient of the mixture.

9. A frozen sweet soufflé as claimed in claim 8, including a flavouring ingredient.

10. A frozen sweet soufflé as claimed in claim 8, comprising a homogeneous mixture of less than about 1.5 centiliter of cooked pastry cream, less than about 1 centiliter of uncooked chou paste and less than about 1.5 centiliter of stiffy beaten egg whites.

11. A frozen sweet soufflé as claimed in claim 10, including less than about 0.5 centiliter of an alcoholic liqueur or less than about 0.25 centiliter of an alcoholic liqueur extract.

12. A frozen sweet soufflé as claimed in claim 10, including less than about 0.25 centiliter of a concentrated natural juice or less than about 0.1 centiliter of an unsweetened extract.

13. A frozen sweet soufflé as claimed in claim 10, wherein said pastry cream is derived from less than about: 1.5 centiliter of whole milk, 0.33 centiliter of egg yolks, 375 centigrams of castor sugar and 185 centigrams of flour; said chou paste is derived from less than about: 1 centiliter of water, 15 centigrams of castor sugar, 15 centigrams of salt, 300 centigrams of butterfat solids, 600 centigrams of flour and 1 centiliter of whole eggs; and said beaten egg whites are derived from less than about: 1.5 centiliter of egg whites and 800-900 centigrams of castor sugar.

14. A frozen sweet soufflé as claimed in claim 13, wherein said butterfat solids are selected from the group comprising butter, margarine and vegetable shortening.

15. A frozen sweet soufflé, comprising an homogeneous mixture of less than about: 1.5 centiliter of whole milk, 1 centiliter of water, 0.7 centiliter of egg yolks, 2.1 centiliters of egg whites, 1250 centigrams of castor sugar, 785 centigrams of flour, 300 centigrams of butterfat solids and 15 centigrams of salt.

16. A frozen sweet soufflé as claimed in claim 15, including less than about 0.5 centiliter of an alcoholic liqueur or less than about 0.25 centiliter of an alcoholic liqueur extract.

17. A frozen sweet soufflé as claimed in claim 15, including less than about 0.25 centiliter of a concentrated natural juice or less than about 0.1 centiliter of an unsweetened extract.

18. A frozen sweet soufflé as claimed in claim 15, wherein said butterfat solids are selected from the group comprising butter, margarine and vegetable shortening.

19. A method of preparation of a freezable food composition for use in preparing sweet soufflés, which comprises incorporating an uncooked chou paste into a boiling cooked pastry cream, mixing over heat to obtain an homogeneous mixture and folding in stiffy beaten egg whites to form a smooth composition; the pastry cream, chou paste and beaten egg whites being utilized in a volume ratio of about 1.5 : 1 : 1.5 based upon the volume of basic liquid of each ingredient.

20. A method of preparation as claimed in claim 19, wherein a flavouring ingredient is added to the hot homogeneous mixture before incorporating the egg whites.

21. A method of preparation as claimed in claim 19, wherein use is made of about 1.5 liter of cooked pastry cream, about 1 liter of uncooked chou paste and about 1.5 liter of stiffy beaten egg whites, whereby to form a composition yielding at least about 100 individual servings of equal volume.

22. A method of preparation as claimed in claim 21, wherein about 0.5 liter of an alcoholic liqueur or about 0.25 liter of an alcoholic liqueur extract is added to the hot homogeneous mixture, before incorporating the egg whites.

23. A method of preparation as claimed in claim 21, wherein about 0.25 liter of a concentrated natural juice or about 0.1 liter of an unsweetened extract is added to the hot homogeneous mixture, before incorporating the egg whites.

24. A method of preparation as claimed in claim 21, wherein said pastry cream is obtained starting from about: 1.5 liter of whole milk, 0.33 liter of egg yolks, 375 grams of castor sugar and 185 grams of flour; said chou paste is obtained starting from about: 1 liter of water, 15 grams of castor sugar, 15 grams of salt, 300 grams of butterfat solids, 600 grams of flour and 1 liter of whole eggs; and said beaten egg whites are obtained starting from about: 1.5 liter of egg whites and 800-900 grams of castor sugar.

25. A method of preparation as claimed in claim 24, wherein the butterfat solids are selected from the group comprising butter, margarine and vegetable shortening.

26. A method of preparation as claimed in claim 24, wherein said pastry cream is obtained by mixing about 0.33 liter of egg yolks and about 175 grams of castor sugar, stirring in the mixture obtained about 185 grams of flour and then about 0.8 liter of boiling milk containing about 100 grams of castor sugar, pouring the resulting mixture into about 0.7 liter of boiling milk containing about 100 grams of castor sugar and maintaining boiling of the cream until cooked.

27. A method of preparation of frozen sweet soufflés, which comprises incorporating an uncooked chou paste into a boiling cooked pastry cream, mixing over heat to obtain a homogeneous mixture, folding in stiffy beaten egg whites to form a smooth composition and freezing said composition at a temperature of about −15° to 20° C; the pastry cream, chou paste and beaten egg whites being utilized in a volume ratio of about 1.5 : 1 : 1.5 based upon the volume of basic liquid of each ingredient.

28. A method of preparation as claimed in claim 27, wherein a flavouring ingredient is added to the hot homogeneous mixture before incorporating the egg whites.

29. A method of preparation as claimed in claim 27, wherein use is made of about 1.5 liter of cooked pastry cream, about 1 liter of uncooked chou paste and about 1.5 liter of stiffy beaten egg whites, and the resulting composition is divided into at least about 100 individual servings of equal volume, before freezing.

30. A method of preparation as claimed in claim 29, wherein about 0.5 liter of an alcoholic liqueur or about 0.25 liter of an alcoholic liqueur extract is added to the hot homogenous mixture, before incorporating the egg whites.

31. A method of preparation as claimed in claim 29, wherein about 0.25 liter of a concentrated natural juice or about 0.1 liter of an unsweetened extract is added to the hot homogeneous mixture, before incorporating the egg whites.

32. A method of preparation as claimed in claim 29, wherein said pastry cream is obtained starting from about: 1.5 liter of whole milk, 0.33 liter of egg yolks, 375 grams of castor sugar and 185 grams of flour; said chou paste is obtained starting from about: 1 liter of water, 15 grams of castor sugar, 15 grams of salt, 300 grams of butterfat solids, 600 grams of flour and 1 liter of whole eggs; and said beaten egg whites are obtained starting from about: 1.5 liter of egg whites and 800–900 grams of castor sugar.

33. A method of preparation as claimed in claim 32, wherein the butterfat solids are selected from the group comprising butter, margarine and vegetable shortening.

34. A method of preparation as claimed in claim 32, wherein said pastry cream is obtained by mixing about 0.33 liter of egg yolks and about 175 grams of castor sugar, stirring in the mixture obtained about 185 grams of flour and then about 0.8 liter of boiling milk containing about 100 grams of castor sugar, pouring the resulting mixture into about 0.7 liter of boiling milk containing about 100 grams of castor sugar and maintaining boiling of the cream until cooked.

* * * * *